United States Patent
Nakamatsu et al.

(10) Patent No.: US 11,906,034 B2
(45) Date of Patent: Feb. 20, 2024

(54) DRIVE APPARATUS

(71) Applicant: NIDEC CORPORATION, Kyoto (JP)

(72) Inventors: Shuhei Nakamatsu, Kyoto (JP);
Keisuke Aso, Kyoto (JP); Ayumi Nakagawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/942,178

(22) Filed: Sep. 12, 2022

(65) Prior Publication Data
US 2023/0082913 A1 Mar. 16, 2023

(30) Foreign Application Priority Data
Sep. 15, 2021 (JP) .................. 2021-150424

(51) Int. Cl.
*F16H 57/04* (2010.01)
*B60K 1/00* (2006.01)

(52) U.S. Cl.
CPC ....... *F16H 57/0424* (2013.01); *F16H 57/043* (2013.01); *B60K 1/00* (2013.01); *B60K 2001/006* (2013.01); *F16H 57/045* (2013.01); *F16H 57/0457* (2013.01)

(58) Field of Classification Search
CPC ............. F16H 57/0457; F16H 57/0424; F16H 57/043; F16H 57/045–0454; B60K 1/00; B60K 2001/001; B60K 2001/006
See application file for complete search history.

(56) References Cited

U.S. PATENT DOCUMENTS

| 8,267,223 | B2* | 9/2012 | Ideshio | B60K 6/52 184/6.12 |
| 8,899,381 | B2* | 12/2014 | Ebihara | F16H 57/0483 184/6.12 |
| 10,746,282 | B2 | 8/2020 | Ito et al. | |
| 2019/0178365 | A1* | 6/2019 | Ishikawa | F16H 57/0493 |

FOREIGN PATENT DOCUMENTS

| JP | H9226394 A | 9/1997 | |
| JP | 2001190042 A | * 7/2001 | ......... F16H 57/0428 |
| JP | 2019138383 A | 8/2019 | |
| JP | 202110289 A | 1/2021 | |
| WO | 2019098166 A1 | 5/2019 | |

* cited by examiner

*Primary Examiner* — Ernesto A Suarez
*Assistant Examiner* — James J Taylor, II
(74) *Attorney, Agent, or Firm* — HAUPTMAN HAM, LLP

(57) ABSTRACT

In a drive apparatus, a ring gear of a differential device is rotatable about a third axis in a direction opposite to a counter gear of a deceleration device. The inner surface of the gear housing accommodating the deceleration device, the differential device, and the reservoir capable of storing a fluid includes first and second curved surfaces disposed in the +X direction with respect to the third and second axes, respectively. At least a part of the first curved surface faces the radially outer end portion of the ring gear in the radial direction and extends in the circumferential direction. At least a part of the second curved surface faces the radially outer end portion of the counter gear in the radial direction and extends in the circumferential direction. The position of the reservoir in the Y-axis direction overlaps the first curved surface and the second curved surface.

13 Claims, 4 Drawing Sheets

DRIVE APPARATUS

CROSS-REFERENCE TO RELATED APPLICATIONS

The present invention claims priority under 35 U.S.C. § 119 to Japanese Patent Application No. 2021-150424 filed on Sep. 15, 2021, the entire content of which is incorporated herein by reference.

FIELD OF THE INVENTION

The present invention relates to a drive apparatus.

BACKGROUND

Conventionally, in a drive apparatus for a vehicle, a technique of scraping up lubricating oil stored in a catch tank by a differential ring gear when a motor shaft rotates forward is known.

However, in the conventional configuration, the lubricating oil cannot be scraped up when the motor shaft is reversed.

SUMMARY

An exemplary drive apparatus according to the present invention includes a motor portion, a deceleration device, a differential device, a reservoir, and a gear housing. The motor portion includes a motor shaft. The motor shaft is rotatable about a first axis extending in a first direction. The deceleration device is connected to a portion of the motor shaft which is located on one side in the first direction. The differential device is connected to the deceleration device. The reservoir can store a fluid. The gear housing accommodates the deceleration device, the differential device, and the reservoir. The deceleration device includes a counter gear. The counter gear is rotatable about a second axis extending in the first direction. The differential device has a ring gear. The ring gear is rotatable about a third axis extending in the first direction in a direction opposite to the counter gear. The inner surface of the gear housing includes a first curved surface and a second curved surface. The first curved surface is disposed on one side in the second direction with respect to a third axis. The second direction is orthogonal to the first direction. The second curved surface is disposed on one side in the second direction with respect to the second axis. At least a part of the first curved surface extends in the circumferential direction while radially facing the radially outer end portion of the ring gear. At least a part of the second curved surface extends in the circumferential direction while radially facing a radially outer end portion of the counter gear. The position of the reservoir in the first direction overlaps the first curved surface and the second curved surface.

The above and other elements, features, steps, characteristics and advantages of the present disclosure will become more apparent from the following detailed description of the preferred embodiments with reference to the attached drawings.

DETAILED DESCRIPTION

Figure 1:
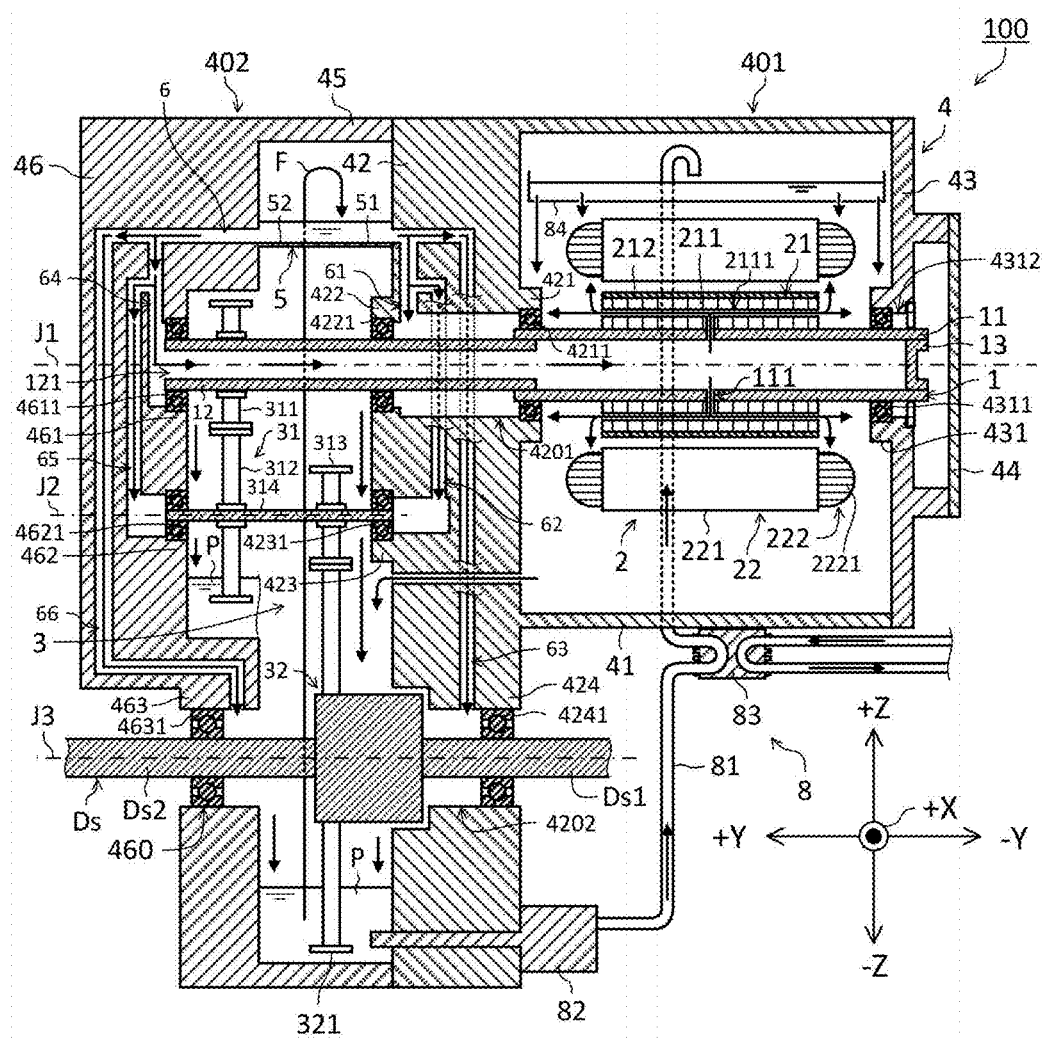
FIG. 1 is a sectional view illustrating a configuration example of a drive apparatus viewed from the X-axis direction.

Hereinafter, an exemplary embodiment will be described with reference to the drawings.

The following description will be made with a gravity direction being partitioned based on a positional relationship in a case where a drive apparatus 100 is mounted in a vehicle 300 located on a horizontal road surface. In the drawings, an XYZ coordinate system is appropriately illustrated as a three-dimensional orthogonal coordinate system. In the XYZ coordinate system, a Z-axis direction is an example the "third direction" according to the present embodiment indicates a vertical direction (that is, up-down direction). The +Z direction is an example of "one of the third directions" in the present invention and indicates an upward direction (a vertically upward direction opposite to the gravity direction). The −Z direction is an example of "the other of the third directions" in the present invention and indicates a downward direction (a vertically downward direction in the same direction as the gravity direction).

In addition, an X-axis direction is a direction orthogonal to the Z-axis direction and illustrates a front-rear direction of the vehicle 300 in which the drive apparatus 100 is mounted. The X-axis direction is an example of "the second direction" in the present invention. The +X direction is an example of "one of the second directions" in the present invention and indicates one of the front and the rear of the vehicle 300. The −X direction is an example of "the other of the second directions" in the present invention and indicates the other of the front and the rear of the vehicle 300.

The Y-axis direction is a direction perpendicular to both the X-axis direction and the Z-axis direction, and is a width direction (right-left direction) of the vehicle 300. The Y-axis direction is an example of "the first direction" in the present invention. When the +X direction is behind the vehicle 300, the +Y direction indicates the left side of the vehicle 300, and the −Y direction indicates the right side of the vehicle 300. However, when the +X direction is the front of the vehicle 300, the +Y direction can be the right side of the vehicle 300, and the −Y direction can be the left side of the vehicle 300. That is, regardless of the X-axis direction, the +Y direction simply becomes one side in the right-left direction of the vehicle 300, and the −Y direction becomes the other side in the right-left direction of the vehicle 300. The +Y direction is an example of "one of the first directions" according to the present invention. The −Y direction is an example of "the other of the first directions" according to the present invention. In addition, depending on a method for mounting the drive apparatus 100 on the vehicle 300, the X-axis direction can be the width direction (right-left direction) of the vehicle 300, and the Y-axis direction can be the front-rear direction of the vehicle 300. In the following description, the Y-axis direction is parallel to, for example, a first axis J1 of the motor portion 2.

In the following description, a direction orthogonal to a predetermined axis such as the first axis J1 to a third axis J3 is simply referred to as a "radial direction", and a circumferential direction around the predetermined axis is referred to as a "circumferential direction". In the radial direction, an orientation approaching an axis is referred to as a "radial inner side", and an orientation separating from the axis is referred to as a "radial outer side".

In the present specification, in the positional relationship between any one of orientations, lines, and surfaces and another one, the term "parallel" means not only a state where both never cross each other no matter how long they extend, but also a state where both are substantially parallel. In addition, the term "perpendicular" includes not only a state where both intersect each other at 90 degrees, but also a state where both are substantially perpendicular. That is, the terms "parallel" and "perpendicular" each include a state where the positional relationship between both permits an angular deviation to a degree that does not depart from the gist of the present invention.

In the present specification, an "annular shape" includes not only a shape continuously connected without any cut along the entire circumferential direction about a predetermined axis such as the first axis J1 to the third axis J3 but also a shape having one or more cuts in a part of the entire circumference direction about the predetermined axis. In addition, a shape that draws a closed curve around a predetermined axis in a curved surface intersecting with the predetermined axis is also included.

Note that these are names used merely for description, and are not intended to limit actual positional relationships, directions, names, and the like.

Figure 2:
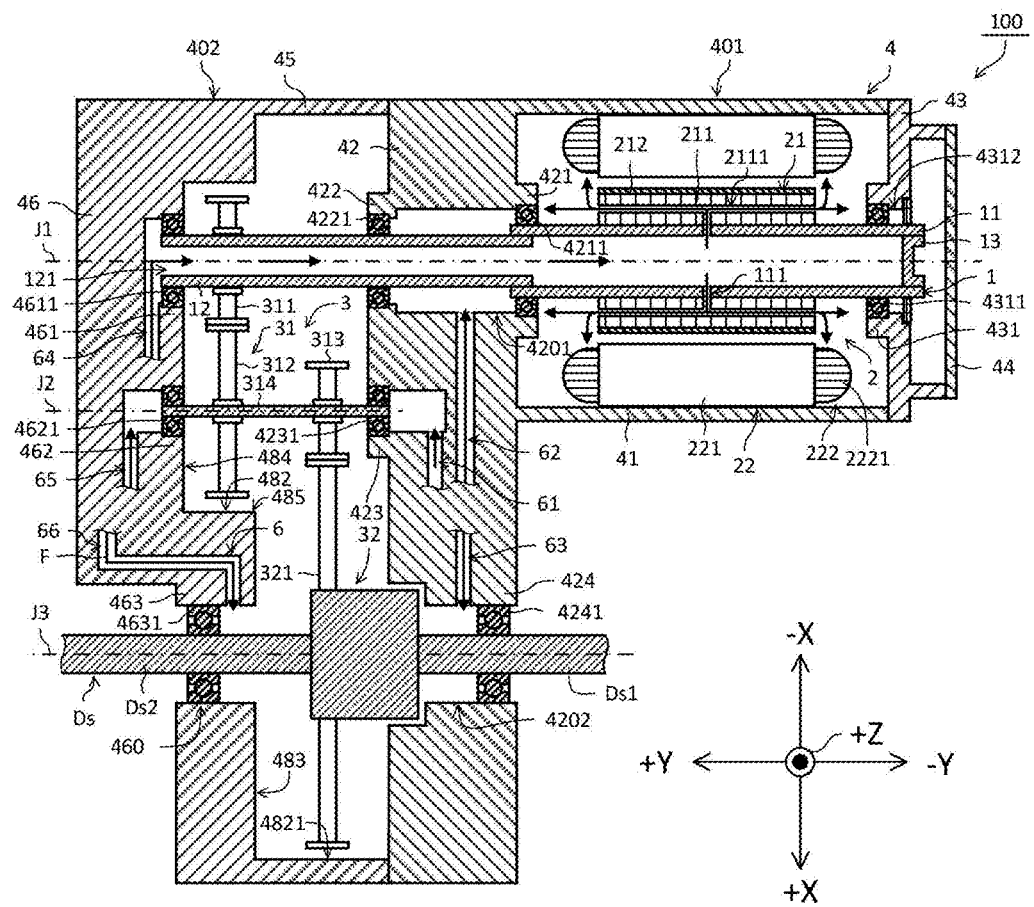
FIG. 2 is a sectional view illustrating a configuration example of the drive apparatus viewed from the Z-axis direction.
Figure 3:
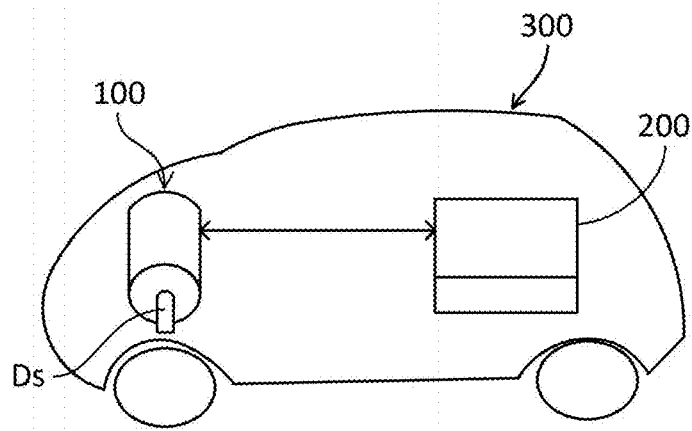
FIG. 3 is a schematic diagram illustrating an example of a vehicle having the drive apparatus mounted thereon.

FIG. 1 is a sectional view illustrating a configuration example of the drive apparatus 100 viewed from the X-axis direction. FIG. 2 is a sectional view illustrating a configuration example of the drive apparatus 100 viewed from the Z-axis direction. FIG. 3 is a schematic diagram illustrating an example of a vehicle 300 having the drive apparatus 100 mounted thereon. Note that FIG. 1 illustrates the drive apparatus 100 viewed from the +X direction toward the −X direction. FIG. 2 illustrates the drive apparatus 100 viewed from the +Z direction toward the −Z direction. FIGS. 1 and 2 are merely conceptual views, and the layout and dimensions of each portion are not necessarily strictly the same as those of the actual drive apparatus 100. FIG. 3 conceptually illustrates the vehicle 300.

In the present embodiment, as illustrated in FIG. 3, the drive apparatus 100 is mounted on the vehicle 300 using at least a motor as a power source. The vehicle 300 is, for example, a hybrid vehicle (HV), a plug-in hybrid vehicle (PHV), or an electric vehicle (EV). The vehicle 300 has the drive apparatus 100. Referring to FIG. 3, the drive apparatus 100 drives front wheels of the vehicle 300. However, the present invention is not limited to the example illustrated in FIG. 3, and the drive apparatus 100 may drive at least one of the wheels. In addition, the vehicle 300 further includes a battery 200. The battery 200 stores electric power to be supplied to the drive apparatus 100.

As illustrated in FIGS. 1 and 2, the drive apparatus 100 includes a motor portion 2, a gear portion 3, a housing 4, a reservoir 5, a fluid supply flow path portion 6, a guide portion 7 (see FIGS. 4 to 7 described later), and a fluid circulation portion 8.

The motor portion 2 is a DC brushless motor. As described above, the drive apparatus 100 includes the motor portion 2. The motor portion 2 is a drive source of the drive apparatus 100 and is driven by electric power supplied from an inverter (not illustrated). The motor portion 2 is an inner rotor type in which a rotor 21 is rotatably disposed radially inward of a stator 22. As illustrated in FIGS. 1 and 2, the motor portion 2 includes a motor shaft 1, the rotor 21, and the stator 22.

The motor shaft 1 is rotatable about the first axis J1 extending in the Y-axis direction. As described above, the motor portion 2 includes the motor shaft 1, and the drive apparatus 100 includes the motor portion 2. The motor shaft 1 has a tubular shape extending in the Y-axis direction. A fluid F flows inside the motor shaft 1. The drive apparatus 100 further includes the fluid F. Note that the fluid F is a lubricant that lubricates the gear portion 3 and each bearing of the drive apparatus 100, and is, for example, an automatic transmission fluid (ATF) in the present embodiment. In addition, the fluid F is used as a refrigerant for cooling the motor portion 2 and the like.

The motor shaft 1 includes a rotor shaft 11 and a gear shaft 12. The rotor shaft 11 holds the rotor 21. The gear shaft 12 is connected to the +Y direction side end of the rotor shaft 11. The rotor shaft 11 and the gear shaft 12 have a tubular shape extending in the Y-axis direction and extend along the first axis J1. In the present embodiment, the both are connected by spline fitting. Alternatively, the shafts may be connected by screw coupling using a male screw and a female screw or may be joined by a fixing method such as press-fitting and welding. When the fixing method such as press-fitting or welding is adopted, serrations combining recesses and protrusions extending in the Y-axis direction may be adopted. With such a configuration, it is possible to reliably transmit rotation from the rotor shaft 11 to the gear shaft 12. However, the present invention is not limited to the example of the present embodiment, and the motor shaft 1 may be a single member.

The motor shaft 1 has a shaft through-hole 111. The shaft through-hole 111 is disposed in the rotor shaft 11 and penetrates the tubular rotor shaft 11 in the radial direction. The number of shaft through-holes 111 may be singular or plural. When the motor shaft 1 rotates, the fluid F inside the motor shaft 1 flows out of the rotor shaft 11 through the shaft through-hole 111 by centrifugal force. Note that the above-described example does not exclude a configuration in which the shaft through-hole 111 and the rotor through-hole 2111 are omitted.

The motor shaft 1 has an inlet 121. The inlet 121 is an opening in an end portion of the motor shaft 1 which is located on the +Y direction side and is an opening in an end portion of the gear shaft 12 which is located on the +Y direction side in the present embodiment. The inlet 121 is connected to the fluid supply flow path portion 6. The fluid F flows into the motor shaft 1 from the fluid supply flow path portion 6 via the inlet 121.

The motor shaft 1 further includes a shaft wall portion 13. The shaft wall portion 13 is disposed inside the rotor shaft 11 on the −Y direction side and expands in the radial direction. The shaft wall portion 13 is disposed in the −Y direction with respect to the shaft through-hole 111. The shaft wall portion 13 closes the opening of the end portion of the rotor shaft 11 which is located on the −Y direction side. A radially outer end portion of the shaft wall portion 13 is connected to an inner surface of the rotor shaft 11. The shaft wall portion 13 may be integrated with the rotor shaft 11 or may be separated from the rotor shaft 11.

The rotor 21 is rotatable together with the motor shaft 1. The drive apparatus 100 includes the rotor 21. The rotor 21 is fixed to the motor shaft 1 and is rotatable about the first axis J1. The rotor 21 rotates when electric power is supplied from the inverter to the stator 22. The rotor 21 includes a rotor core 211 and a magnet 212. The rotor core 211 is a magnetic body and is formed by, for example, stacking thin electromagnetic steel plates in the Y-axis direction. The rotor core 211 is fixed to the radially outer surface of the rotor shaft 11. A plurality of the magnets 212 are fixed to the rotor core 211. The plurality of magnets 212 are arranged along the circumferential direction with magnetic poles arranged alternately.

In addition, the rotor core 211 has the rotor through-hole 2111. The rotor through-hole 2111 penetrates the rotor core 211 in the Y-axis direction and is connected to the shaft through-hole 111. The rotor through-hole 2111 is used as a flow path of the fluid F that also functions as the refrigerant. When the rotor 21 rotates, the fluid F flowing through the inside of the motor shaft 1 can flow into the rotor through-hole 2111 via the shaft through-hole 111. In addition, the fluid F flowing into the rotor through-hole 2111 can flow out from both end portions of the rotor through-hole 2111 in the Y-axis direction to the outside. The fluid F having flowed out flies toward the stator 22 and cools, for example, a coil portion 222 (particularly, a coil end 2221 thereof) to be described later and the like. In addition, the flowed fluid F flies toward a first motor bearing 4211, a second motor bearing 4311, and the like that rotatably support the motor shaft 1, and lubricates and cools the bearings.

The stator 22 is arranged radially outward of the rotor 21. The drive apparatus 100 includes the stator 22. The stator 22 faces the rotor 21 with a gap therebetween in the radial direction. The stator 22 includes a stator core 221 and the coil portion 222. The stator 22 is held by a first housing tubular portion 41 to be described later. The stator core 221 has a plurality of magnetic pole teeth (not shown) extending radially inward from an inner surface of an annular yoke (not shown). The coil portion 222 is formed by winding a conductive wire around the magnetic pole teeth via an insulator (not illustrated). The coil portion 222 has the coil end 2221 protruding from the end surface of the stator core 221 in the Y-axis direction Next, the gear portion 3 is connected to the +Y direction side of the motor shaft 1 and is connected to the gear shaft 12 in the present embodiment. The gear portion 3 is a power transmission device that transmits power of the motor portion 2 to a drive shaft Ds to be described later. The gear portion 3 includes a deceleration device 31 and a differential device 32.

The deceleration device 31 is connected to the portion of the motor shaft 1 which is located on the +Y direction side. The drive apparatus 100 includes the deceleration device 31. In the present embodiment, the deceleration device 31 is connected to the gear shaft 12. The deceleration device 31 reduces a rotation speed of the motor portion 2 and increases torque output from the motor portion 2 according a reduction ratio. The deceleration device 31 transmits the torque output from the motor portion 2 to the differential device 32. The deceleration device 31 includes a pinion gear 311, a counter gear 312, a drive gear 313, and an intermediate shaft 314.

The pinion gear 311 is fixed to the radially outer surface of the motor shaft 1 on the +Y direction side of the motor shaft 1. The gear portion 3 includes the pinion gear 311. For example, the pinion gear 311 is disposed on the radially outer surface of the gear shaft 12. The pinion gear 311 may be integrated with the gear shaft 12 or may be separated from the gear shaft 12 and firmly fixed to the radially outer surface of the gear shaft 12. The pinion gear 311 is rotatable about the first axis J1 together with the motor shaft 1.

The intermediate shaft 314 extends along a second axis J2 and is rotatable about the second axis J2. The second axis J2 extends in the Y-axis direction. The gear portion 3 includes the intermediate shaft 314. Both ends of the intermediate shaft 314 are rotatably supported about the second axis J2 by a first intermediate bearing 4231 and a second intermediate bearing 4621.

The counter gear 312 is rotatable about the second axis J2 extending in the Y-axis direction. As described above, the deceleration device 31 includes the counter gear 312. The counter gear 312 is fixed to the radially outer surface of the intermediate shaft 314 and meshes with the pinion gear 311. The drive gear 313 is fixed to the radially outer surface of the intermediate shaft 314. The gear portion 3 includes the counter gear 312 and the drive gear 313. The drive gear 313 is disposed in the −Y direction with respect to the second gear and meshes with a ring gear 321 of the differential device 32. Each of the counter gear 312 and the drive gear 313 may be integrated with the intermediate shaft 314 or may be separated from the intermediate shaft 314 and firmly fixed to the radially outer surface of the intermediate shaft 314. The counter gear 312 and the drive gear 313 are rotatable about the second axis J2 together with the intermediate shaft 314.

The torque of the motor shaft 1 is transmitted from the pinion gear 311 to the counter gear 312. Then, the torque transmitted to the counter gear 312 is transmitted to the drive gear 313 via the intermediate shaft 314. Furthermore, the torque is transmitted from the drive gear 313 to the ring gear 321 of the differential device 32.

The differential device 32 is connected to the deceleration device 31. The drive apparatus 100 includes the differential device 32. The differential device 32 is attached to the drive shaft Ds and transmits torque transmitted from the deceleration device 31 to the drive shaft Ds. The differential device 32 has the ring gear 321. The ring gear 321 is rotatable about the third axis J3 extending in the Y-axis direction in a direction opposite to the counter gear 312. The ring gear 321 meshes with the drive gear 313. The torque of the ring gear 321 is output to the drive shaft Ds.

The ring gear 321 is disposed in the −Y direction with respect to the counter gear 312. By disposing the ring gear 321 in the −Y direction closer to the motor portion 2 than the counter gear 312 in the Y-axis direction, a portion of the gear lid portion 46 which overlaps the ring gear 321 in the Y-axis direction can be disposed closer to the motor portion 2 (see FIGS. 1 and 2). Therefore, a gear housing 48 to be described later that accommodates the gear portion 3 can be made more compact. Therefore, it is possible to contribute to the downsizing of the drive apparatus 100.

The drive shaft Ds includes a first drive shaft Ds1 and a second drive shaft Ds2. The first drive shaft Ds1 is attached in the −Y direction of the differential device 32. The second drive shaft Ds2 is attached in the +Y direction of the differential device 32. For example, the differential device 32 transmits the torque to the drive shafts Ds1 and Ds2 on both the Y-axis sides while absorbing a rotation speed difference between the drive shafts Ds1 and Ds2 on both the Y-axis sides when the vehicle 300 turns.

The housing 4 accommodates the motor portion 2. More specifically, the housing 4 accommodates the motor shaft 1, the rotor 21, the stator 22, the gear portion 3, and the like. The housing 4 includes a first housing tubular portion 41, a side plate portion 42, the housing lid portion 43, a cover member 44, a second housing tubular portion 45, and the gear lid portion 46. Note that the first housing tubular portion 41, the side plate portion 42, the housing lid portion 43, the cover member 44, the second housing tubular portion 45, and the gear lid portion 46 are formed using, for example, a conductive material, and in the present embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

The housing 4 further includes a motor housing 47 and a gear housing 48. These will be described later.

The first housing tubular portion 41 has a tubular shape extending in the Y-axis direction. The motor portion 2, a fluid reservoir 84 to be described later, and the like are arranged inside the first housing tubular portion 41. In addition, a stator core 221 is fixed to the inner surface of the first housing tubular portion 41.

The side plate portion 42 covers the end portion of the first housing tubular portion 41 which is located on the +Y direction side and covers the end portion of the second housing tubular portion 45 which is located on the −Y direction side. The side plate portion 42 expands in a direction intersecting the first axis J1 and divides the first housing tubular portion 41 from the second housing tubular portion 45. In the present embodiment, the first housing tubular portion 41 and the side plate portion 42 are integrated. As a result, the rigidity of these portions can be enhanced. However, the present invention is not limited to this example, and both may be separate bodies.

The side plate portion 42 has a side plate through-hole 4201 and a first drive shaft through-hole 4202. The side plate through-hole 4201 and the first drive shaft through-hole 4202 penetrates the side plate portion 42 in the Y-axis direction. The center of the side plate through-hole 4201 coincides with the first axis J1. The motor shaft 1 extends through the side plate through-hole 4201. The center of the first drive shaft through-hole 4202 coincides with the third axis J3. The first drive shaft Ds1 extends through the first drive shaft through-hole 4202. An oil seal (not illustrated) for sealing between the first drive shaft Ds1 and the first drive shaft through-hole 4202 is arranged in a gap therebetween.

In addition, the side plate portion 42 further includes a first motor bearing holder 421, a first gear bearing holder 422, a first intermediate bearing holder 423, and a first drive bearing holder 424. The first motor bearing holder 421 is disposed on the −Y direction side of the inner surface of the side plate through-hole 4201 and holds the first motor bearing 4211. The first motor bearing 4211 rotatably supports the end portion of the rotor shaft 11 which is located on the +Y direction side. The first gear bearing holder 422 is disposed on the +Y direction side of the inner surface of the side plate through-hole 4201 and holds a first gear bearing 4221. The first gear bearing 4221 rotatably supports the end portion of the gear shaft 12 which is located on the −Y direction side. The first intermediate bearing holder 423 is arranged on the end surface of the side plate portion 42 which is located on the −Y direction side and holds the first intermediate bearing 4231. The first intermediate bearing 4231 rotatably supports the end portion of the intermediate shaft 314 which is located on the −Y direction side. The first drive bearing holder 424 is disposed on the inner surface of the first drive shaft through-hole 4202 and holds the first drive bearing 4241. The first drive bearing 4241 rotatably supports the first drive shaft Ds1.

The housing lid portion 43 extends in a direction intersecting the first axis J1 and covers the end portion of the first housing tubular portion 41 in the −Y direction. The housing lid portion 43 can be fixed to the first housing tubular portion 41 by, for example, a screw, but is not limited thereto, and a method of firmly fixing the housing lid portion 43 to the first housing tubular portion 41, such as screwing or press-fitting, can be widely adopted. As a result, the housing lid portion 43 can be brought into close contact with the end portion of the first housing tubular portion 41 which is located on the −Y direction side. Note that the term "close contact" means to have such a sealing property to an extent that the fluid F inside the members does not leak to the outside and to an extent that foreign matter such as external water, dirt, or dust does not enter. It is assumed that the same is applied below for the close contact.

In addition, the housing lid portion 43 includes a second motor bearing holder 431. The second motor bearing holder 431 holds a second motor bearing 4311. The second motor bearing 4311 rotatably supports the end portion of the rotor shaft 11 which is located on the −Y direction side. The second motor bearing holder 431 has an opening portion 4312 through which the rotor shaft 11 extends. The opening portion 4312 penetrates the housing lid portion 43 in the Y-axis direction and surrounds the first axis J1 when viewed from the Y-axis direction.

The cover member 44 is disposed on the end surface of the housing lid portion 43 which is located on the −Y direction side and covers the opening portion 4312 and the end portion of the motor shaft 1 which is located on the −Y direction side. The cover member 44 can be attached to the housing lid portion 43 by, for example, screwing, but is not limited thereto, and a method of firmly fixing the cover member 44 to the housing lid portion 43, such as screwing or press-fitting, can be widely adopted. A rotation detector (for example, a resolver) that detects the rotation angle of the rotor can be accommodated in a space surrounded by the cover member 44 and the housing lid portion 43. In this space, a neutralization apparatus that electrically connects the motor shaft 1 and the housing 4 may be disposed.

The second housing tubular portion 45 has a tubular shape surrounding the gear portion 3 and extends in the Y-axis direction. The end portion of the second housing tubular portion 45 which is located on the −Y direction side is connected to the side plate portion 42 and covered with the side plate portion 42. In the present embodiment, the second housing tubular portion 45 is detachably attached to the end portion of the side plate portion 42 which is located on the +Y direction side. In addition, the second housing tubular portion 45 can be attached to the side plate portion 42 by, for example, fixing with a screw, but is not limited thereto, and a method of firmly fixing the second housing tubular portion 45 to the side plate portion 42, such as screwing or press-fitting, can be widely adopted. As a result, the second housing tubular portion 45 can be brought into close contact with the end portion of the side plate portion 42 which is located on the +Y direction side.

The gear lid portion 46 is disposed in the +Y direction with respect to the counter gear 312 and expands in a direction intersecting the Y-axis direction. In the present embodiment, the second housing tubular portion 45 and the gear lid portion 46 are integrated. However, the present invention is not limited to this example, and both may be separate bodies.

The gear lid portion 46 includes a second drive shaft through-hole 460. The second drive shaft through-hole 460 penetrates the gear lid portion 46 in the Y-axis direction. The center of the second drive shaft through-hole 460 coincides with the third axis J3. The second drive shaft Ds2 extends through the second drive shaft through-hole 460. An oil seal (not illustrated) is disposed in a gap between the second drive shaft Ds2 and the second drive shaft through-hole 460.

The gear lid portion 46 further includes a second gear bearing holder 461, a second intermediate bearing holder 462, and a second drive bearing holder 463. The second gear bearing holder 461 and the second intermediate bearing holder 462 are arranged on the end surface of the gear lid portion 46 which is located on the −Y direction side. The second gear bearing holder 461 holds a second gear bearing 4611. The second gear bearing 4611 rotatably supports the end portion of the gear shaft 12 which is located on the +Y direction side. The second intermediate bearing holder 462 holds the second intermediate bearing 4621. The second intermediate bearing 4621 rotatably supports the end portion of the intermediate shaft 314 which is located on the +Y direction side. The second drive bearing holder 463 is disposed on the inner surface of the second drive shaft through-hole 460 and holds a second drive bearing 4631. The second drive bearing 4631 rotatably supports the second drive shaft Ds2.

The motor housing 47 accommodates the motor portion 2. More specifically, the motor housing 47 accommodates the rotor shaft 11, the rotor 21, the stator 22, and the like. In the present embodiment, the motor housing 47 includes the first housing tubular portion 41, the side plate portion 42, and the housing lid portion 43.

Figure 4:
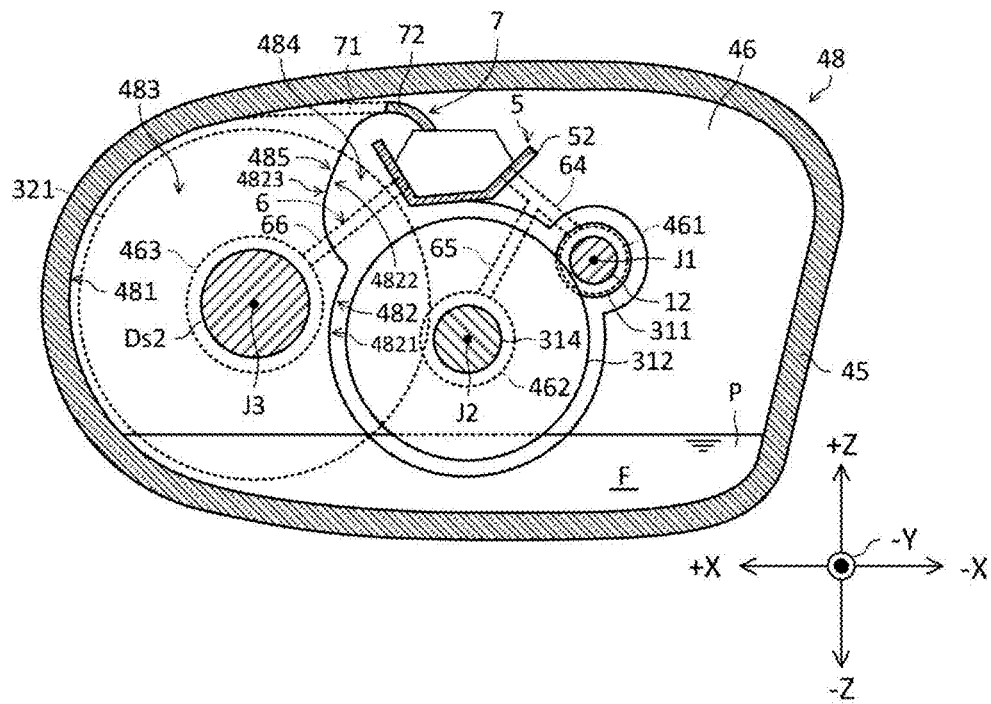
FIG. 4 is a conceptual diagram illustrating a configuration example on the +Y direction side of a gear housing.
Figure 5:
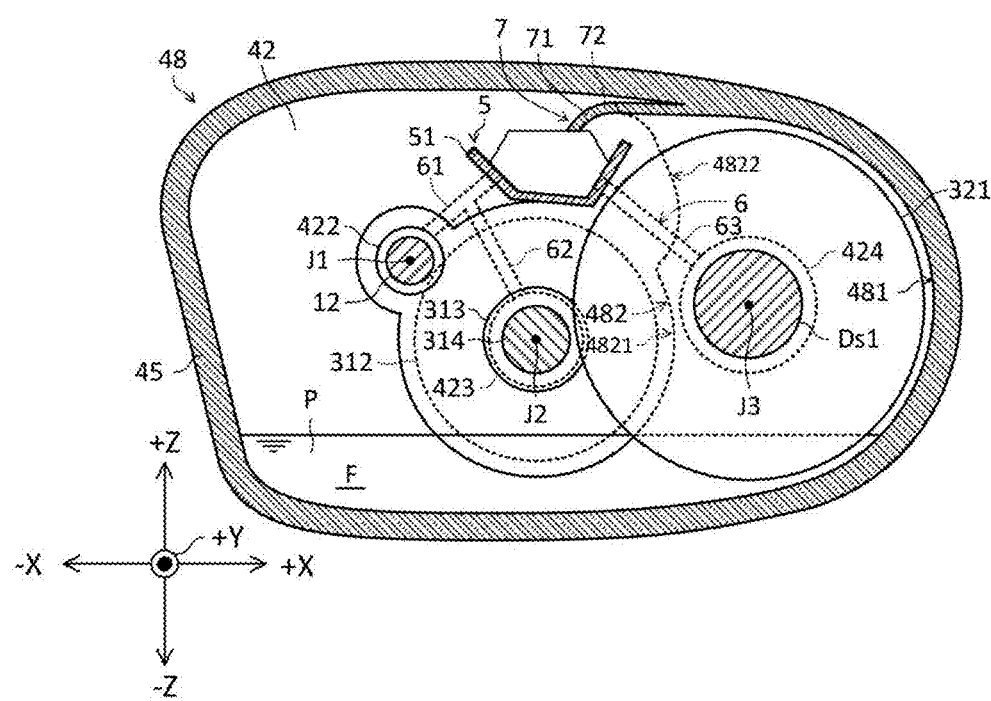
FIG. 5 is a conceptual diagram illustrating a configuration example on the −Y direction side of the gear housing.
Figure 6:
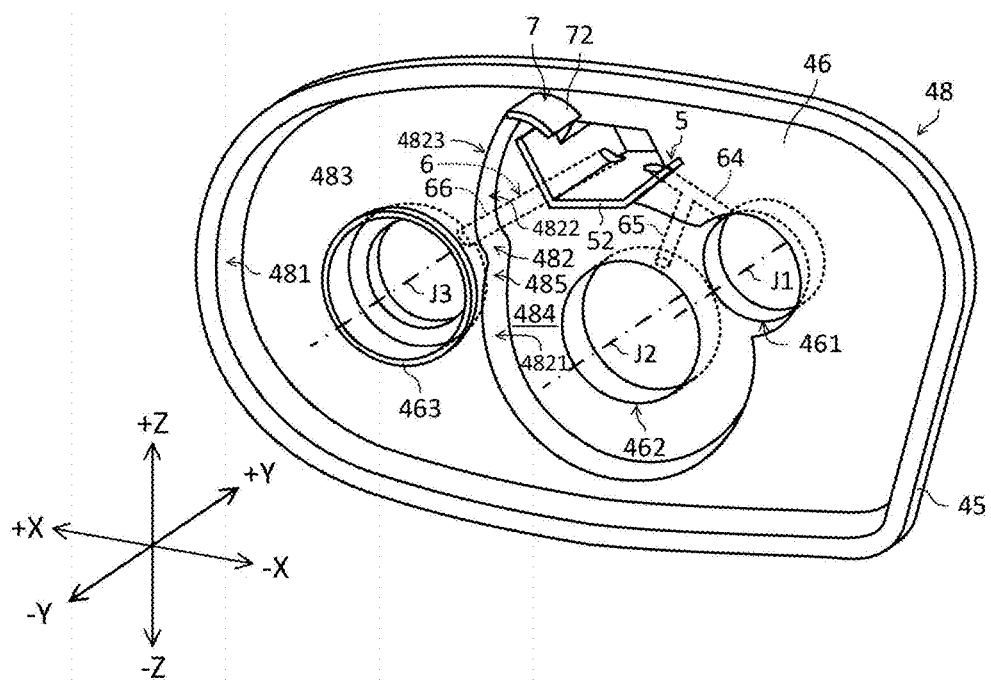
FIG. 6 is a perspective view of a second housing tubular portion and a gear lid portion.

The gear housing 48 will be described next with reference to FIGS. 1 to 2 and FIGS. 4 to 6. FIG. 4 is a conceptual diagram illustrating a configuration example on the +Y direction side of the gear housing 48. FIG. 5 is a conceptual diagram illustrating a configuration example on the −Y direction side of the gear housing 48. FIG. 6 is a perspective view of the second housing tubular portion 45 and the gear lid portion 46. FIGS. 4 and 6 show the gear housing 48 viewed from the −Y direction toward the +Y direction. On the other hand, FIG. 5 shows the gear housing 48 viewed from the +Y direction toward the −Y direction. Accordingly, it should be noted that the +X direction and the −X direction in FIG. 5 are opposite to the +X direction and the −X direction in FIGS. 4 and 6, respectively.

The gear housing 48 accommodates the gear shaft 12 and the gear portion 3. In particular, the gear housing 48 accommodates the deceleration device 31, the differential device 32, and the reservoir 5. As described above, the drive apparatus 100 includes the gear housing 48. In the present embodiment, the gear housing 48 includes the side plate portion 42, the second housing tubular portion 45, and the gear lid portion 46. That is, the gear housing 48 has the side plate portion 42 and the second housing tubular portion 45. The gear housing 48 has the gear lid portion 46.

The gear housing 48 includes the first gear bearing 4221, the second gear bearing 4611, the first gear bearing holder 422, and the second gear bearing holder 461. The first gear bearing 4221 and the second gear bearing 4611 rotatably support the gear shaft 12 via the first gear bearing holder 422 and the second gear bearing holder 461, respectively.

The gear housing 48 includes the first intermediate bearing 4231, the second intermediate bearing 4621, the first intermediate bearing holder 423, and the second intermediate bearing holder 462. The first intermediate bearing holder 423 and the second intermediate bearing holder 462 rotatably support the intermediate shaft 314 via the first intermediate bearing 4231 and the second intermediate bearing 4621, respectively.

The gear housing 48 includes a first drive bearing 4241 and a second drive bearing 4631. The gear housing 48 has the first drive bearing holder 424. The first drive bearing holder 424 rotatably supports the first drive shaft Ds1 via the first drive bearing 4241. The gear housing 48 includes the second drive bearing holder 463. The second drive bearing holder 463 rotatably supports the second drive shaft Ds2 via the second drive bearing 4631. The second drive bearing holder 463 is an example of a "bearing holder" according to the present invention. The second drive bearing 4631 is an example of a "bearing" according to the present invention.

Hereinafter, the first gear bearing 4221, the first intermediate bearing 4231, the first drive bearing 4241, the second gear bearing 4611, the second intermediate bearing 4621, and the second drive bearing 4631 may be collectively referred to as "bearings 4221, 4231.4241, 4611, 4621, and 4631". In addition, the first gear bearing holder 422, the first intermediate bearing holder 423, the first drive bearing holder 424, the second gear bearing holder 461, the second intermediate bearing holder 462, and the second drive bearing holder 463 may be collectively referred to as "bearing holders 422, 423, 424, 461, 462, and 463".

A fluid pool P in which the fluid F is accumulated disposed in a lower portion in the gear housing 48. A part of the gear portion 3 (for example, the counter gear 312 and the ring gear 321) is immersed in the fluid pool P. The fluid F accumulated in the fluid pool P is scraped up by the operation of the gear portion 3 and supplied to the inside of the gear housing 48. For example, the fluid F is scraped up by the tooth surface of the ring gear 321 when the motor shaft 1 rotates in one circumferential direction and is scraped up by the tooth surface of the counter gear 312 when the motor shaft 1 rotates in the other circumferential direction. A part of the scraped fluid F is supplied to the gears and the bearings of the deceleration device 31 and the differential device 32 in the gear housing 48 and used for lubrication. In addition, other part of the scraped fluid F is stored in the reservoir 5, supplied to the inside of the motor shaft 1, supplied to the rotor 21 and the stator 22 of the motor portion 2 and the bearings in the gear housing 48, and used for cooling and lubrication.

The inner surface of the gear housing 48 includes a first curved surface 481 and a second curved surface 482.

The first curved surface 481 is disposed on one side in the X-axis direction (for example, the +X direction) with respect to the third axis J3. As described above, the X-axis direction is perpendicular to the Y-axis direction. As described above, the inner surface of the gear housing 48 includes the first curved surface 481. At least a part of the first curved surface 481 faces the radially outer end portion of the ring gear 321 in the radial direction and extends in the circumferential direction. In the present embodiment, the first curved surface 481 is a part of the inner surface of the second housing tubular portion 45 (for example, a surface on the +X direction side) and expands in the Y-axis direction. For example, the first curved surface 481 extends in the circumferential direction along the radially outer surface (that is, the tooth surface) of the ring gear 321 from the −Z direction side toward the +Z direction side with respect to the ring gear 321.

The second curved surface 482 is disposed in the +X direction with respect to the second axis J2. As described above, the inner surface of the gear housing 48 includes the second curved surface 482. At least a part of the second curved surface 482 faces the radially outer end portion of the counter gear 312 in the radial direction and extends in the circumferential direction. In the present embodiment, the second curved surface 482 is disposed on the gear lid portion 46. At least a part of the second curved surface 482 is disposed in the +X direction with respect to the counter gear 312. For example, the second curved surface 482 extends from the −Z direction side toward the +Z direction side of the counter gear 312.

The position of the reservoir 5 in the Y-axis direction overlaps the first curved surface 481 and the second curved surface 482. For example, the position of the portion of the reservoir 5 on the −Y direction side in the Y-axis direction overlaps the first curved surface 481. The position of the portion of the reservoir 5 on the +Y direction side in the Y-axis direction overlaps the second curved surface 482. Accordingly, when the motor shaft 1 rotates in one circumferential direction (for example, counterclockwise when viewed from the +Y direction to the −Y direction), the fluid F accumulated in the gear housing 48 is scraped up at the tooth tip of the ring gear 321 rotating in the same direction as the motor shaft 1 and can be guided by the first curved surface 481 to move toward the reservoir 5. On the other hand, when the motor shaft 1 rotates in the other circumferential direction (for example, clockwise as viewed from the +Y direction to the −Y direction), the fluid F accumulated in the gear housing 48 is scraped up at the tooth tip of the counter gear 312 rotating in the direction opposite to the motor shaft 1 and can be guided by the second curved surface 482 to move toward the reservoir 5. Since the first curved surface 481 and the second curved surface 482 are parts of the inner surface of the gear housing 48, a rib or the like for guiding the fluid F may not be disposed in the gear housing 48. Therefore, with a simple configuration, the fluid F accumulated in the gear housing 48 can be scraped up and stored in the reservoir 5 regardless of in which direction the motor shaft 1 rotates.

The second curved surface 482 includes a first surface 4821 and a second surface 4822.

The first surface 4821 extends in the circumferential direction along the radially outer end portion of the counter gear 312. As described above, the second curved surface 482 includes the first surface 4821. For example, the first surface 4821 extends in the circumferential direction along the radially outer surface (that is, the tooth surface) of the counter gear 312 from the −Z direction side toward the +Z direction side with respect to the counter gear 312. The first surface 4821 is disposed on the gear lid portion 46 and expands in the Y-axis direction. The first surface 4821 faces the counter gear 312 in the radial direction with reference to the second axis J2 and expands in the Y-axis direction.

The second surface 4822 extends in the +Z direction from an end portion of the first surface 4821 which is located on the +Z direction side. As described above, the second curved surface 482 includes the second surface 4822. The second surface 4822 is disposed on the gear lid portion 46 and expands at least in the Y-axis direction. An end portion of the second curved surface 482 which is located on the +Z direction side is disposed in the +Z direction with respect to the reservoir 5. For example, the second surface 4822 extends at least in the Z-axis direction from the −Z direction side toward the +Z direction side with respect to a second reservoir 52 described later. Thus, the fluid F moving in the +Z direction by scraping up with the counter gear 312 can be suitably guided to the reservoir 5 by the second curved surface 482.

Preferably, the second surface 4822 includes a first concave surface 4823 recessed in the +X direction. In the present embodiment, the inner surface of the first concave surface 4823 is at least a part of the second surface 4822. By disposing the first concave surface 4823, the second surface 4822 can be disposed closer to the third axis J3. Therefore, for example, when viewed from the Y-axis direction, the interval between the first concave surface 4823 of the second surface 4822 and the second drive bearing 4631 arranged around the third axis J3 can be made close to the interval between the first surface 4821 and the second drive bearing 4631 arranged around the third axis. Accordingly, the bias of the vibration transmitted from the second drive bearing 4631 arranged around the third axis J3 to the second curved surface 482 can be reduced. As a result, the vibration near the second curved surface 482 can be further reduced. Note that this example does not exclude a configuration in which the second surface 4822 does not include the first concave surface 4823. For example, when viewed from the Y-axis direction, the second surface 4822 may linearly extend from the connection portion with the first surface 4821 toward the end portion on the +Z direction side.

Preferably, the second surface 4822 spreads in the +X direction toward the −Y direction. For example, the second surface 4822 spreads in a direction obliquely crossing the Y-axis direction. The end portion of the second surface 4822 which is located on the +Y direction side is disposed in the −X direction with respect to the end portion of the second surface 4822 which is located on the −Y direction side. Accordingly, by inclining the second surface 4822 in the Y-axis direction as described above, the free end side (that is, the −Y direction side) of the second surface 4822 can be brought closer to the third axis J3 than the fixed end side (that is, the +Y direction side) of the second surface 4822. Therefore, the vibration transmitted from the second drive bearing 4631 disposed around the third axis J3 to the second surface 4822 can be reduced. However, this example does not exclude a configuration in which the second surface 4822 does not expand in the +X direction as it goes in the −Y direction. For example, the second surface 4822 may be parallel to the Y-axis direction.

The inner surface of the gear housing 48 further includes a first inner surface 483 and a second inner surface 484. Each of the first inner surface 483 and the second inner surface 484 is a part of an end surface of the gear lid portion 46 which is located on the −Y direction side, expands in a direction intersecting the Y-axis direction, and expands in a direction perpendicular to the Y-axis direction in the present embodiment.

The first inner surface 483 is disposed in the +Y direction with respect to the ring gear 321 and overlaps the ring gear 321 in the Y-axis direction. As described above, the inner surface of the gear housing 48 further includes the first inner surface 483. An end portion of the second curved surface 482 which is located on the −Y direction side is connected to the first inner surface 483.

The second inner surface 484 is disposed in the +Y direction with respect to the first inner surface 483 and the counter gear 312, and overlaps the counter gear 312 in the Y-axis direction. As described above, the inner surface of the gear housing 48 further includes the second inner surface 484. An end portion of the second curved surface 482 which is located on the +Y direction side is connected to the second inner surface 484.

The second curved surface 482, the first inner surface 483, and the second inner surface 484 form a step 485. The step 485 is disposed between a portion overlapping the counter gear 312 of the gear housing 48 in the Y-axis direction and a portion overlapping the ring gear 321 in the Y-axis direction. In the above configuration, the inner surface of the step 485 which faces a direction intersecting the Y-axis direction (for example, the −X direction) can be effectively used as the second curved surface 482 that guides the fluid F scraped up by the counter gear 312 to the reservoir 5. That is, the second curved surface 482 can be disposed in the gear housing 48 without forming a rib or the like facing the counter gear 312.

The reservoir 5 can store the fluid F. As described above, the drive apparatus 100 includes the reservoir 5. The reservoir 5 is disposed in the gear housing 48. The reservoir 5 is disposed on one side in the Z-axis direction (for example, the +Z direction) with respect to the second axis J2. Note that the Z-axis direction is perpendicular to the Y-axis direction and the X-axis direction.

The reservoir 5 has a recess recessed in the −Z direction and can store the fluid F scraped up by, for example, the counter gear 312 and the ring gear 321. Part of the fluid F stored in the reservoir 5 is supplied to the fluid supply flow path portion 6 and is supplied to each bearing holder disposed in the gear housing 48. Other part of the fluid F flows into the motor shaft 1 from the inlet 121.

Preferably, the reservoir 5 is disposed on the −X direction side with respect to an end portion the counter gear 312 which is located on the most one side in the X-axis direction (that is, an end portion on the most +X direction side). Accordingly, the fluid F scraped up along the second curved surface 482 easily enters the reservoir 5. However, this example does not exclude a configuration in which the reservoir 5 is not disposed on the −X direction side with respect to the end portion of the counter gear 312 which is located on the most +X direction side.

In the present embodiment, the reservoir 5 includes a first reservoir 51 and a second reservoir 52. The first reservoir 51 extends in the +Y direction from the side plate portion 42. The second reservoir 52 extends in the −Y direction from the gear lid portion 46. Preferably, the second reservoir 52 faces the first reservoir 51 in the Y-axis direction and extends along the first reservoir 51 as viewed in the Y-axis direction. For example, the second reservoir 52 overlaps the first reservoir 51 when viewed from the Y-axis direction. More preferably, the end portion of the second reservoir 52 which is located on the −Y direction side is in contact with the end portion of the first reservoir 51 which is located on the +Y direction side. In this way, since no gap is formed between the first reservoir 51 and the second reservoir 52, the reservoir 5 can suitably store the fluid F without spilling it from the gap. However, this example does not exclude the configuration in which the end portion of the second reservoir 52 which is located on the −Y direction side faces the end portion of the first reservoir 51 which is located on the +Y direction side in the Y-axis direction with a gap. For example, the end portion of the second reservoir 52 which is located on the −Y direction side can be disposed near the end portion of the first reservoir 51 which is located on the +Y direction side in the Y-axis direction.

The present invention is not limited to the example of the present embodiment, and the reservoir 5 may include only one of the first reservoir 51 and the second reservoir 52. For example, the reservoir 5 may extend in the +Y direction from the side plate portion 42. At this time, the end portion of the reservoir 5 which is located on the +Y direction side may be in contact with the gear lid portion 46 or may face the gear lid portion 46 in the Y-axis direction with a gap. Alternatively, the reservoir 5 may extend in the −Y direction from the gear lid portion 46. At this time, an end portion of the reservoir 5 which is located on the −Y direction side may be in contact with the side plate portion 42 or may face the side plate portion 42 in the Y-axis direction with a gap.

The fluid supply flow path portion 6 is a passage of the fluid F disposed in the gear housing 48. The gear housing 48 has a fluid supply flow path portion 6. The fluid supply flow path portion 6 connects the inside of the reservoir 5 and the insides of the bearing holders 422, 423, 424, 461, 462, and 463. The fluid F stored in the reservoir 5 can be directly supplied to the bearings 4221, 4231, 4241, 4611, 4621, and 4631 through the fluid supply flow path portion 6 and can suitably lubricate the bearings 4221, 4231, 4241, 4611, 4621, and 4631.

For example, the fluid supply flow path portion 6 includes a first supply flow path portion 61, a second supply flow path portion 62, and a third supply flow path portion 63. In the present embodiment, these path portions are formed inside the side plate portion 42. However, the present invention is not limited to this example, and at least some of these parts may be formed outside the side plate portion 42.

The first supply flow path portion 61 connects the inside of the reservoir 5 and the first gear bearing holder 422. One end of the first supply flow path portion 61 is connected to the inside of the first reservoir 51. The other end of the first supply flow path portion 61 is connected to the side plate through-hole 4201. The fluid F is supplied from the inside of the first reservoir 51 to the first gear bearing holder 422 via the first supply flow path portion 61 and the side plate through-hole 4201 and can lubricate and cool the first gear bearing 4221. The fluid F flowing through the first supply flow path portion 61 can lubricate and cool the first motor bearing 4211.

The second supply flow path portion 62 connects the inside of the reservoir 5 and the first intermediate bearing holder 423. One end of the second supply flow path portion 62 is connected to the first supply flow path portion 61 in the present embodiment, but may be connected to the inside of the first reservoir 51. The other end of the second supply flow path portion 62 is connected to the first intermediate bearing holder 423. The fluid F is supplied from the inside of the first reservoir 51 to the first intermediate bearing holder 423 via the second supply flow path portion 62 and can lubricate and cool the first intermediate bearing 4231.

The third supply flow path portion 63 connects the inside of the reservoir 5 and the first drive bearing holder 424. One end of the third supply flow path portion 63 is connected to the inside of the first reservoir 51. The other end of the third supply flow path portion 63 is connected to the first drive bearing holder 424. The fluid F is supplied from the inside of the first reservoir 51 to the first drive bearing holder 424 via the third supply flow path portion 63 and can lubricate and cool the first drive bearing 4241.

The fluid supply flow path portion 6 includes a fourth supply flow path portion 64, a fifth supply flow path portion 65, and a sixth supply flow path portion 66. In the present embodiment, these flow paths are formed inside the gear lid portion 46. However, the present invention is not limited to this example, and at least some of them may be formed outside the gear lid portion 46.

The fourth supply flow path portion 64 connects the inside of the reservoir 5 and the second gear bearing holder 461. One end of the fourth supply flow path portion 64 is connected to the inside of the second reservoir 52 and is disposed in the +Y direction with respect to the first inner surface 483. The other end of the fourth supply flow path portion 64 is connected to the second gear bearing holder 461. The fluid F is supplied from the inside of the second reservoir 52 to the second gear bearing holder 461 via the fourth supply flow path portion 64. Part of the fluid F flowing through the fourth supply flow path portion 64 can lubricate and cool the second gear bearing 4611. Other part of the fluid F flowing through the fourth supply flow path portion 64 can flow into the motor shaft 1 from the inlet 121.

The fifth supply flow path portion 65 connects the inside of the reservoir 5 and the second intermediate bearing holder 462. One end of the fifth supply flow path portion 65 is connected to the fourth supply flow path portion 64 in the present embodiment, but may be connected to the inside of the second reservoir 52. One end of the fifth supply flow path portion 65 is disposed in the +Y direction with respect to the first inner surface 483. The other end of the fifth supply flow path portion 65 is connected to the second intermediate bearing holder 462. The fluid F is supplied from the inside of the second reservoir 52 to the second intermediate bearing holder 462 via the fifth supply flow path portion 65 and can lubricate and cool the second intermediate bearing 4621.

The sixth supply flow path portion 66 connects the inside of the reservoir 5 and the second drive bearing holder 463. The sixth supply flow path portion 66 is an example of the "supply flow path portion" according to the present invention. The fluid F stored in the reservoir 5 can be directly supplied to the second drive bearing 4631 by the sixth supply flow path portion 66. This makes it possible to suitably lubricate the second drive bearing 4631 of the drive shaft Ds (specifically, the second drive shaft Ds2).

One end of the sixth supply flow path portion 66 is connected to the inside of the second reservoir 52 and is disposed in the +Y direction with respect to the first inner surface 483. This makes it possible to adjust the flow path length of the sixth supply flow path portion 66 by bringing the position of one end of the sixth supply flow path portion 66 in the Y-axis direction close to one end of the fourth supply flow path portion 64 (and one end of the fifth supply flow path portion 65). Therefore, the flow path length of the sixth supply flow path portion 66 can be brought close to the fourth supply flow path portion 64 and the fifth supply flow path portion 65. As a result, the flow rate of the fluid F flowing through the sixth supply flow path portion 66 can be adjusted to, for example, about the same level as the flow rate of the fluid F flowing through the fourth supply flow path portion 64 and the fifth supply flow path portion 65.

The other end of the sixth supply flow path portion 66 is connected to the second drive bearing holder 463. The fluid F is supplied from the inside of the second reservoir 52 to the second drive bearing holder 463 via the sixth supply flow path portion 66 and can lubricate and cool the second drive bearing 4631.

In the present embodiment, the sixth supply flow path portion 66 is disposed in the +Y direction with respect to the end portion of the second curved surface 482 which is located on the −Y direction side and, more specifically, is disposed in the +Y direction with respect to the end portion of the second curved surface 482 which is located on the +Y direction side. However, the present invention is not limited to the example of the present embodiment, and the sixth supply flow path portion 66 may be disposed in the −Y direction with respect to the end portion of the second curved surface 482 which is located on the +Y direction side or may be disposed in the −Y direction with respect to the end portion of the second curved surface 482 which is located on the −Y direction side. The sixth supply flow path portion 66 may be disposed in at least one of the +Y direction with respect to the end portion of the second curved surface 482 which is located on the −Y direction side and the −Y direction with respect to the end portion of the second curved surface 482 which is located on the +Y direction side. The sixth supply flow path portion 66 may be singular or plural. This makes it possible to suitably guide the fluid F scraped up by the counter gear 312 to the reservoir 5 along the second curved surface 482. However, the present invention is not limited to the above example, and the sixth supply flow path portion 66 may be disposed at the same position as the end portion of the second curved surface 482 which is located on the +Y direction side or at the same position as the end portion of the second curved surface 482 which is located on the −Y direction side in the Y-axis direction. That is, at least one sixth supply flow path portion 66 may cross an end portion of the second curved surface 482 in the Y-axis direction.

In the present embodiment, the sixth supply flow path portion 66 is disposed in the +Y direction with respect to the counter gear 312. However, the present invention is not limited to this example, and the sixth supply flow path portion 66 may be disposed in the −Y direction with respect to the counter gear 312. That is, the sixth supply flow path portion 66 may be disposed in at least one of the +Y direction with respect to the end portion of the counter gear 312 which is located on the +Y direction side and the −Y direction with respect to the end portion of the counter gear 312 which is located on the −Y direction side. Thus, the fluid F scraped up by the counter gear 312 can be suitably guided to the reservoir 5 without being obstructed by the sixth supply flow path portion 66.

The guide portion 7 guides the fluid F scraped by the counter gear 312 and the ring gear 321 to the reservoir 5. In the present embodiment, the guide portion 7 includes a first guide portion 71 and a second guide portion 72. That is, the gear housing 48 includes the first guide portion 71 and the second guide portion 72.

The first guide portion 71 protrudes from the side plate portion 42 in the +Y direction and extends at least in the X-axis direction. The first guide portion 71 extends from an end portion of the first curved surface 481 toward the reservoir 5. More specifically, the first guide portion 71 extends at least in the −X direction from an end portion of the first curved surface 481 which is located on the +Z direction side and the −X direction side. Preferably, the −X direction side of the first guide portion 71 extends in the −Z direction toward the end portion on the −X direction side. The fluid F scraped by the ring gear 321 and guided by the first curved surface 481 can be efficiently guided to the reservoir 5 by the first guide portion 71.

The second guide portion 72 protrudes in the −Y direction from the gear lid portion 46 and extends at least in the X-axis direction. The second guide portion 72 extends from an end portion of the second curved surface 482 toward the reservoir 5. More specifically, the second guide portion 72 extends at least in the −X direction from an end portion on the +Z direction side and the −X direction side of the second curved surface 482. Preferably, the −X direction side of the second guide portion 72 extends in the −Z direction toward the end portion on the −X direction side. The fluid F scraped up by the counter gear 312 and guided by the second curved surface 482 can be efficiently guided to the reservoir 5 by the second guide portion 72.

Preferably, the second guide portion 72 faces the first guide portion 71 in the Y-axis direction and extends along the first guide portion 71 when viewed from the Y-axis direction. For example, the second guide portion 72 overlaps the first guide portion 71 when viewed from the Y-axis direction. Thus, the fluid F guided by at least one of the first curved surface 481 and the second curved surface 482 can be guided to the reservoir 5 by both the first guide portion 71 and the second guide portion 72. For example, even if the fluid F guided from the first curved surface 481 along the first guide portion 71 spills from the end portion of the first guide portion 71 in the Y-axis direction toward the second guide portion 72, at least part of the fluid F can be guided to the reservoir 5 along the second guide portion 72. Even if the fluid F guided from the second curved surface 482 along the second guide portion 72 spills from the end portion of the second guide portion 72 in the Y-axis direction toward the first guide portion 71, at least part of the fluid F can be guided to the reservoir 5 along the first guide portion 71. Therefore, the scraped fluid F can be more efficiently stored in the reservoir 5.

More preferably, the end portion of the second guide portion 72 which is located on the −Y direction side is in contact with the end portion of the first guide portion 71 which is located on the +Y direction side. In this way, since no gap is formed between the first guide portion 71 and the second guide portion 72, the guide portion 7 can suitably guide the fluid F to the reservoir 5 without spilling the fluid F from the gap. However, this example does not exclude the configuration in which the end portion of the second guide portion 72 which is located on the −Y direction side faces the end portion of the first guide portion 71 which is located on the +Y direction side in the Y-axis direction with a gap. For example, the end portion of the second guide portion 72 which is located on −Y direction side can be disposed near the end portion of the first guide portion 71 which is located on +Y direction side in the Y-axis direction.

Note that the present invention is not limited to the example of the present embodiment, and the guide portion 7 may include only one of the first guide portion 71 and the second guide portion 72. For example, the guide portion 7 may extend in the +Y direction from the side plate portion 42. At this time, the end portion of the guide portion 7 which is located on the +Y direction side may be in contact with the gear lid portion 46 or may face the gear lid portion 46 in the Y-axis direction with a gap. Alternatively, the guide portion 7 may extend in the −Y direction from the gear lid portion 46. At this time, the end portion of the guide portion 7 which is located on the −Y direction side may be in contact with the side plate portion 42 or may face the side plate portion 42 in the Y-axis direction with a gap.

That is, the gear housing 48 may have at least one of the first guide portion 71 and the second guide portion 72. Thus, the scraped fluid F can be efficiently stored in the reservoir 5.

The fluid circulation portion 8 will be described next. The fluid circulation portion 8 includes a pipe portion 81, a pump 82, a heat exchanger 83, and a fluid reservoir 84.

The pipe portion 81 connects the pump 82 and the fluid reservoir 84 disposed inside the first housing tubular portion 41. The pump 82 sucks the fluid F stored in the fluid pool P and supplies the fluid F to the fluid reservoir 84. The pump 82 is an electric pump in the present embodiment.

The heat exchanger 83 is disposed between the pump 82 and the fluid reservoir 84 in the pipe portion 81. That is, the fluid F sucked by the pump 82 passes through the heat exchanger 83 via the pipe portion 81 and then is sent to the fluid reservoir 84. A refrigerant such as water supplied from the outside is supplied to the heat exchanger 83. The heat exchanger 83 exchanges heat between the refrigerant and the fluid F to lower the temperature of the fluid F.

The fluid reservoir 84 is a tray disposed vertically above the stator 22 inside the motor housing 47. A dropping hole (whose reference sign is omitted) is formed at a bottom of the fluid reservoir 84, and the motor portion 2 is cooled by dropping the fluid F from the dropping hole. The dropping hole is formed above the coil end 2221 of the coil portion 222 of the stator 22, for example, and the coil portion 222 is cooled by the fluid F.

Figure 7:
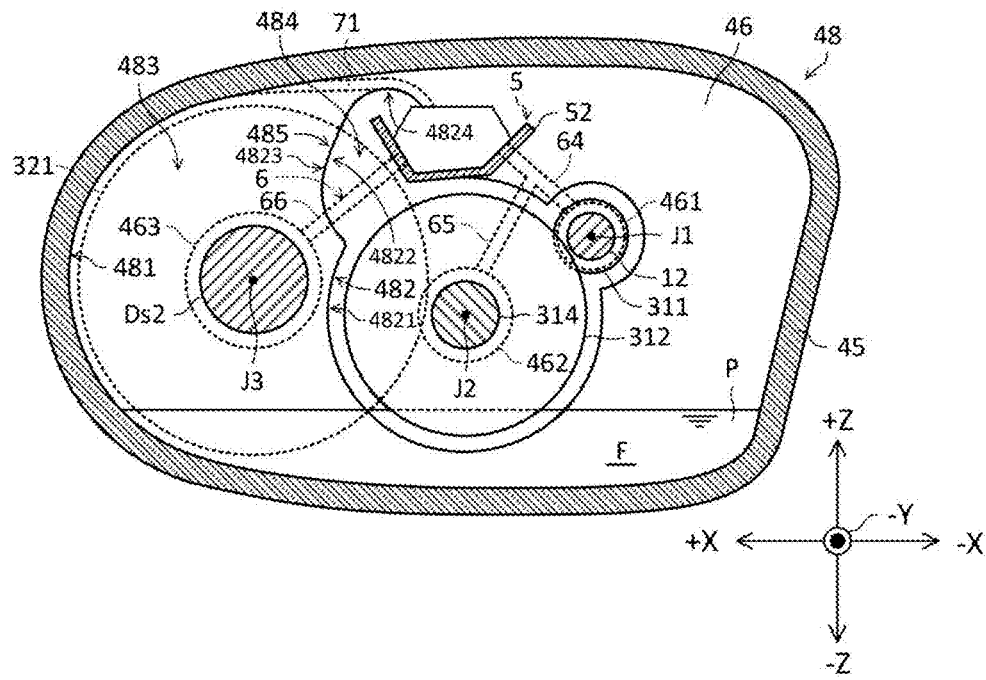
FIG. 7 is a conceptual diagram illustrating a configuration example on the +Y direction side of the gear housing.

A modification of the embodiment will be described next with reference to FIG. 7. FIG. 7 is a conceptual diagram illustrating a configuration example on the +Y direction side of the gear housing 48. Referring to FIG. 7, the gear housing 48 is viewed from the −Y direction toward the +Y direction. It should be noted that the +X direction and the −X direction in FIG. 7 are the same as the +X direction and the −X direction in FIGS. 4 and 6 but are opposite to the +X direction and the −X direction in FIG. 5.

Hereinafter, the configurations different from the above-described embodiment will be described. In addition, the same components as those in the above-described embodiment are denoted by the same reference signs, and the description thereof may be omitted.

In the modification, a second concave surface 4824 is disposed instead of the second guide portion 72. The second concave surface 4824 is disposed on the gear lid portion 46 and expands at least in the Y-axis direction. The second surface 4822 includes the second concave surface 4824. The second concave surface 4824 is disposed at an end portion on the +Z direction side of the second surface 4822 and is recessed in the +Z direction. Preferably, the end of the first guide portion 71 which is located on the +Y direction side is disposed in the +Z direction with respect to the second surface 4822 and is in contact with the gear lid portion 46. Thus, the fluid F scraped up by the counter gear 312 and moving along the second curved surface 482 can be suitably guided to the reservoir 5 by the second concave surface 4824. Further, a member (for example, the second guide portion 72) that guides the fluid F to the reservoir 5 may not be connected to the end portion of the second curved surface 482 which is located on the +Z direction side. Therefore, the fluid F can be guided to the reservoir 5 with a simple configuration.

The embodiment of the present invention has been described above. Note that the scope of the present invention is not limited to the above-described embodiment. The present invention can be implemented by making various modifications to the above-described embodiment within a range not departing from the gist of the invention. In addition, the matters described in the above-described embodiments are arbitrarily combined together as appropriate within a range where no inconsistency occurs.

In the present embodiment and the modification, the present invention is applied to the in-vehicle drive apparatus 100. However, the present invention is not limited to this example, and the present invention is also applicable to drive apparatuses or the like used for applications other than in-vehicle applications.

The present invention is useful, for example, in a device in which a gear portion scoops up a fluid in a gear housing.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus, comprising:
   a motor portion having a motor shaft rotatable about a first axis extending in a first direction;
   a deceleration device connected to a portion of the motor shaft which is located on a first side in the first direction;
   a differential device connected to the deceleration device;
   a reservoir configured to store a fluid; and
   a gear housing configured to accommodate the deceleration device, the differential device, and the reservoir, wherein
   the deceleration device includes a counter gear rotatable about a second axis extending in the first direction,
   the differential device includes a ring gear rotatable in a direction opposite to the counter gear about a third axis extending in the first direction,
   the ring gear is disposed on a second side in the first direction with respect to the counter gear, the second side opposite the first side in the first direction,
   an inner surface of the gear housing includes:
      a first curved surface disposed on a first side in a second direction perpendicular to the first direction with respect to the third axis,
      a second curved surface disposed on the first side in the second direction with respect to the second axis,
      a first inner surface that is disposed on the first side in the first direction with respect to the ring gear, and overlaps the ring gear in the first direction, and
      a second inner surface that is disposed on the first side in the first direction with respect to the first inner surface and the counter gear, and overlaps the counter gear in the first direction,
   at least a part of the first curved surface extends in a circumferential direction so as to face a radially outer end portion of the ring gear in a radial direction,
   at least a part of the second curved surface extends in the circumferential direction while radially facing a radially outer end portion of the counter gear,
   a position of a first portion of the reservoir on the second side in the first direction overlaps the first curved surface,
   a position of a second portion of the reservoir on the first side in the first direction overlaps the second curved surface,
   a first end portion of the second curved surface which is located on the first side in the first direction is connected to the second inner surface,
   a second end portion of the second curved surface which is located on the second side in the first direction is connected to the first inner surface,
   the gear housing includes a gear lid portion disposed on the first side in the first direction with respect to the counter gear, and
   the first curved surface, the second curved surface, the first inner surface, and the second inner surface are formed in the gear lid portion.

2. The drive apparatus according to claim 1, wherein the gear housing further includes a bearing holder configured to rotatably support a drive shaft connected to the differential device via a bearing and a supply flow path portion connecting an inside of the reservoir and an inside of the bearing holder.

3. The drive apparatus according to claim 2, wherein the supply flow path portion is disposed on at least one of:
   the first side in the first direction with respect to the second end portion of the second curved surface, and
   the second side in the first direction with respect to the first end portion of the second curved surface.

4. The drive apparatus according to claim 2, wherein the supply flow path portion is disposed on at least one of:
   the first side in the first direction with respect to the counter gear, and
   the second side in the first direction with respect to the counter gear.

5. The drive apparatus according to claim 2, wherein
   the gear lid portion further includes a second gear bearing holder and a second intermediate bearing holder,
   the supply flow path portion includes a fourth supply flow path portion, and a fifth supply flow path portion,
   the fourth supply flow path portion connects the inside of the reservoir and the second gear bearing holder, and
   the fifth supply flow path portion connects the inside of the reservoir and the second intermediate bearing holder.

6. The drive apparatus according to claim 1, wherein
   the reservoir is disposed on a first side in a third direction with respect to the second axis,
   the third direction is perpendicular to the first direction and the second direction,
   the second curved surface includes:
      a first surface extending in the circumferential direction along the radially outer end portion of the counter gear, and
      a second surface extending from a first end portion of the first surface which is located on the first side in the third direction toward the first side in the third direction, and
   a third end portion of the second curved surface which is located on the first side in the third direction is disposed on the first side in the third direction with respect to the reservoir.

7. The drive apparatus according to claim 6, wherein the second surface includes a first concave surface that is concave toward the first side in the second direction.

8. The drive apparatus according to claim 6, wherein
   the gear lid portion expands in at least one of the second and third directions, and
   the second surface is disposed on the gear lid portion, expands in the first direction, and expands in the second direction.

9. The drive apparatus according to claim 6, wherein
   the second surface includes a second concave surface that is concave toward the first side in the third direction, and
   the second concave surface is disposed at the third end portion of the second curved surface.

10. The drive apparatus according to claim 1, wherein the gear housing further includes at least one of:
    a first guide portion extending from an end portion of the first curved surface toward the reservoir, and
    a second guide portion extending from an end portion of the second curved surface toward the reservoir.

11. The drive apparatus according to claim 10, wherein
    the gear housing includes the first guide portion and the second guide portion, and
    the second guide portion extends along the first guide portion when viewed from the first direction.

12. The drive apparatus according to claim 1, wherein the reservoir is disposed on a second side in the second direction with respect to the radially outer end portion of the counter gear on the first side in the second direction, the second side opposite the first side in the second direction.

13. A drive apparatus, comprising:
a motor portion having a motor shaft rotatable about a first axis extending in a first direction;
a deceleration device connected to a portion of the motor shaft which is located on a first side in the first direction;
a differential device connected to the deceleration device;
a reservoir configured to store a fluid; and
a gear housing configured to accommodate the deceleration device, the differential device, and the reservoir,
wherein
the deceleration device includes a counter gear rotatable about a second axis extending in the first direction,
the differential device includes a ring gear rotatable in a direction opposite to the counter gear about a third axis extending in the first direction,
an inner surface of the gear housing includes:
   a first curved surface disposed on a first side in a second direction perpendicular to the first direction with respect to the third axis, and
   a second curved surface disposed on the first side in the second direction with respect to the second axis,
at least a part of the first curved surface extends in a circumferential direction so as to face a radially outer end portion of the ring gear in a radial direction,
at least a part of the second curved surface extends in the circumferential direction while radially facing a radially outer end portion of the counter gear,
a position of a first portion of the reservoir on a second side in the first direction overlaps the first curved surface, the second side opposite the first side in the first direction,
a position of a second portion of the reservoir on the first side in the first direction overlaps the second curved surface,
the first curved surface is offset in the first direction from the second curved surface,
the reservoir is disposed on a first side in a third direction with respect to the second axis,
the third direction is perpendicular to the first direction and the second direction,
the second curved surface includes:
   a first surface extending in the circumferential direction along the radially outer end portion of the counter gear, and
   a second surface extending from a first end portion of the first surface which is located on the first side in the third direction toward the first side in the third direction, and
a third end portion of the second curved surface which is located on the first side in the third direction is disposed on the first side in the third direction with respect to the reservoir.

* * * * *